US012374311B2

(12) United States Patent
Jackson

(10) Patent No.: US 12,374,311 B2
(45) Date of Patent: Jul. 29, 2025

(54) VIBRATO DEVICE AND RELATED METHODS

(71) Applicant: David H. Jackson, Dahlonega, GA (US)

(72) Inventor: David H. Jackson, Dahlonega, GA (US)

( * ) Notice: Subject to any disclaimer, the term of this patent is extended or adjusted under 35 U.S.C. 154(b) by 208 days.

(21) Appl. No.: 17/559,836

(22) Filed: Dec. 22, 2021

(65) Prior Publication Data

US 2023/0197039 A1 Jun. 22, 2023

(51) Int. Cl.
*G10D 3/153* (2020.01)
*G10D 1/08* (2006.01)

(52) U.S. Cl.
CPC ............... *G10D 3/153* (2020.02); *G10D 1/08* (2013.01)

(58) Field of Classification Search
CPC ................................. G10D 3/153; G10D 1/08
See application file for complete search history.

(56) References Cited

U.S. PATENT DOCUMENTS

D169,120 S * 3/1953 Bigsby ............................ D17/21
D170,109 S * 8/1953 Bigsby ............................ D17/21
3,457,821 A * 7/1969 Huis ....................... G10D 3/153 D17/21
3,500,711 A * 3/1970 Fender ................... G10D 3/153 84/313
4,802,397 A * 2/1989 Petschulat .............. G10D 3/153 984/124
4,843,941 A * 7/1989 Nichols .................. G10D 3/153 84/293
4,882,967 A * 11/1989 Rose ...................... G10D 3/153 84/313
4,903,568 A * 2/1990 Itoh ........................ G10D 3/153 84/313
4,928,564 A * 5/1990 Borisoff ................. G10D 3/153 84/313
5,088,375 A * 2/1992 Saijo ...................... G10D 3/153 84/313
5,196,641 A * 3/1993 Schaller ................. G10D 3/153 84/740
5,429,028 A * 7/1995 Fisher, IV .............. G10D 3/153 84/313
5,637,818 A * 6/1997 Fishman ................ G10D 3/153 84/267

(Continued)

*Primary Examiner* — Robert W Horn
(74) *Attorney, Agent, or Firm* — Buche & Associates, P.C.; John K. Buche; Bryce A. Johnson

(57) ABSTRACT

Disclosed is an improved vibrato device. The typical components of the disclosed device include, but are not limited to, a dual spring-loaded lever arm 10. The lever arm 10 is intended to sit separate and away from the instrument's strings 70 to allow for the user to manipulate the instrument's vibrato while playing by manually moving the lever arm 10 closer to or farther from the instrument. The lever arm 10 connects to the dual spring system 15; the dual spring system 15 houses the vibrato device's springs that allow vibrato manipulation and sits attached to the tremolo system's tailpiece 60, which anchors the vibrato device to the instrument, and the pivoting metal bar 40. The pivoting metal bar 40 is the strings' 70 anchor-point at the base of the instrument, and the bar 40 pivots in response to the lever arm 10 being raised or lowered. When the bar 40 pivots, it either lessens the strings' 70 tension when the lever arm 10 is lowered or increases the strings' 70 tension when the lever arm 10 is raised.

5 Claims, 10 Drawing Sheets

(56) References Cited

U.S. PATENT DOCUMENTS

| | | | | | |
|---|---|---|---|---|---|
| 5,672,835 | A * | 9/1997 | Doughty | G10D 3/153 | 84/313 |
| 5,986,190 | A * | 11/1999 | Wolff | G10D 3/04 | 84/307 |
| 6,198,036 | B1 * | 3/2001 | Hoshino | G10H 3/185 | 84/DIG. 24 |
| 6,201,172 | B1 * | 3/2001 | Denton | G10D 3/153 | 84/313 |
| 7,339,102 | B2 * | 3/2008 | Folmar | G10D 3/153 | 84/313 |
| 7,935,876 | B1 * | 5/2011 | West | G10D 3/153 | 84/200 |
| 8,678,659 | B2 * | 3/2014 | Miller | G10D 3/153 | 384/313 |
| 9,142,197 | B2 * | 9/2015 | Oldfield | G10D 3/153 | |
| 9,299,325 | B1 * | 3/2016 | Brickwell | G10D 1/08 | |
| 9,330,639 | B1 * | 5/2016 | Armstrong | G10D 3/153 | |
| 9,847,076 | B1 * | 12/2017 | McCabe | G10D 1/085 | |
| 10,580,391 | B2 * | 3/2020 | Tobias | G10D 3/153 | |
| 11,610,565 | B2 * | 3/2023 | Hildebrandt | G10D 3/153 | |
| 2016/0232881 | A1 * | 8/2016 | Alday | G10D 3/153 | |
| 2022/0343881 | A1 * | 10/2022 | Kebrle | G10D 3/153 | |
| 2023/0197039 | A1 * | 6/2023 | Jackson | G10D 1/08 | 84/313 |
| 2023/0245634 | A1 * | 8/2023 | Powers | G10D 3/153 | 84/313 |

* cited by examiner

FIG. 9A
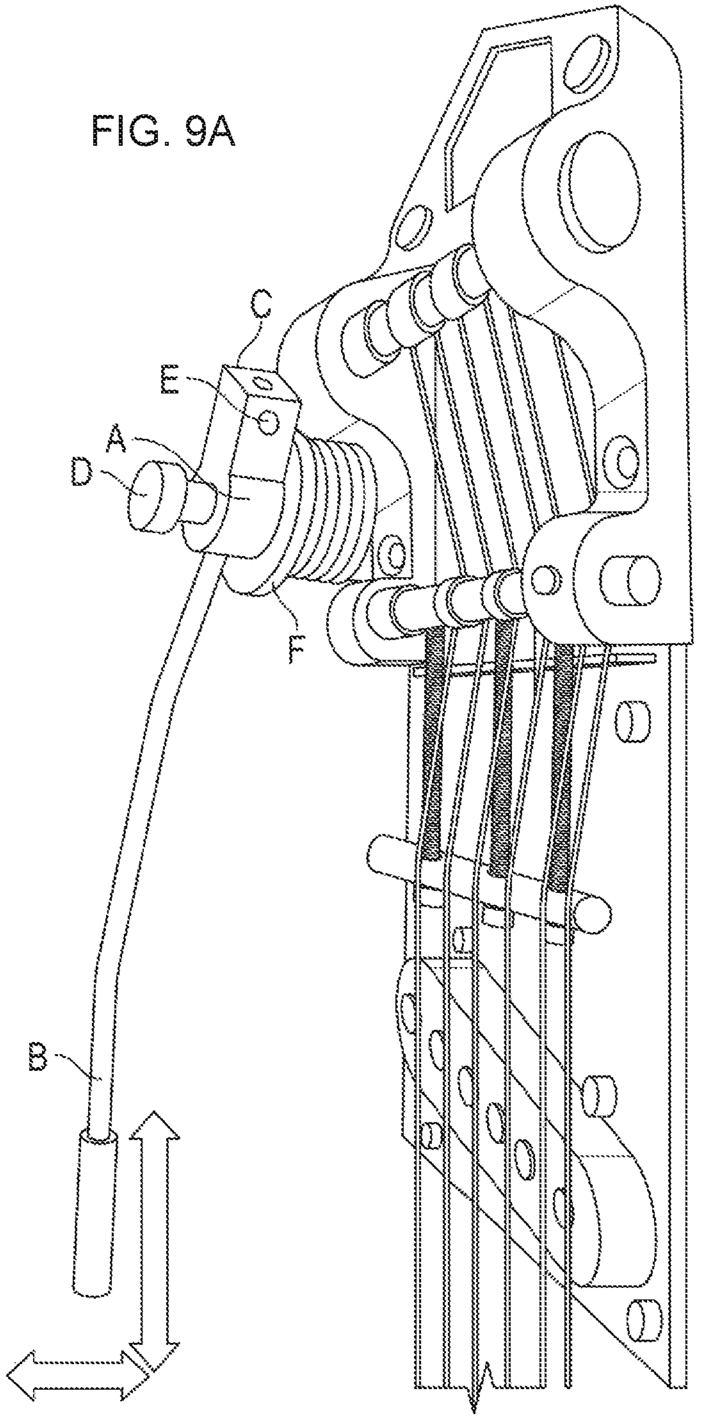
FIG. 9B
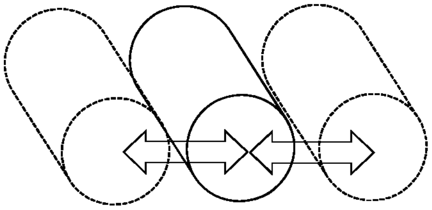
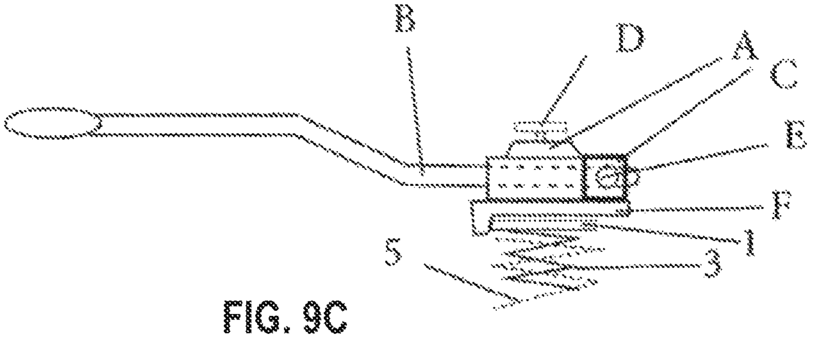
FIG. 9C

VIBRATO DEVICE AND RELATED METHODS

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Field of Invention

The disclosed subject matter is in the field of tremolo assemblies including tremolo arms, saddles, pressure bars, vibrato tailpieces, and related methods.

Background of the Invention

Vibrato is a musical effect consisting of pulsating changes in pitch. Vibrato is a desirable effect for musicians that play a guitar or other stringed musical instrument. Traditionally, stringed instrument players accomplish the vibrato effect via wrist action to increase or lessen the tension of a string while a string is pressed taut against, e.g., a fret of a guitar. The traditional, wrist-action vibrato is difficult to master. So, a need arose for vibrato devices that assist a stringed instrument player in accomplishing a vibrato effect without having to master the wrist-action technique.

Bigbsy® produced a vibrato device, also known as a tremolo arm system, shown as FIG. 1. This device accomplishes a vibrato effect via a spring-loaded lever arm attached to a pivoting metal arm or bar, around which the strings of a guitar are installed. In a neutral or unused position, the pull of the taut strings is countered by the spring-load of the lever arm. This counterbalance is useful for providing an initial pitch when the strings are plucked. When the lever arm is lifted, the pivoting metal bar rotates to increase the string tension, resulting in a higher pitch. The arm may be depressed to loosen the strings and lower the pitch of the plucked string. Using this device, a vibrato effect can be accomplished by raising or lowering the lever arm.

Unfortunately, raising or lowering lever arm of the Bigsby®-style vibrato devices is not satisfactory in all situations. Despite a spring-load in the Bigsby®-style device that is designed to counterbalance the pull of the strings, the strings are often put out of chordal tune (i.e., tune relative to one another) by manipulation of the lever arm. This detuning during use of the lever arm is particularly bothersome to professional musicians because an instrument can become unsatisfactorily detuned during use. Accordingly, a need exists for improved vibrato devices/tremolo systems that are less susceptible to detuning.

SUMMARY OF THE INVENTION

Accordingly, it is an object of the present invention to provide an improved vibrato device or tremolo system.

It is yet another object of the present invention to provide an improved vibrato device or tremolo system that may be constructed originally or may be used to retrofit existing stringed instruments.

It is yet another object of the present invention to provide an improved vibrato device or tremolo system that allows a stringed instrument player to have more consistent changes in pitch.

It is yet another object of the present invention to provide an improved vibrato device or tremolo system that is less susceptible to detuning during use.

One objective is to provide an easily adjustable handle that may be customized to meet a musician's desired dimensions for a handle, including the height of the handle relative to the instrument, and length of the handle from its attachment point to the instrument. Suitably, the customization of the height and length can be accomplished via a locking screw which, when unlocked further enables the handle to be folded tightly against the instrument during storage.

One more objective of the disclosure is to teach a dual-spring stop system, which provides a first controlled stopping point for the vibrato when the handle is pulled away from the instrument and a second controlled stopping point for the vibrato when the handle is pushed toward the instrument. Such stopping points suitably prevent a variable resting position of the vibrato and associated detuning of the instrument described above.

Other objectives of the invention will become apparent to those skilled in the art once the invention has been shown and described. These objectives are not to be construed as limitations of applicant's invention, but are merely aimed to suggest some of the many benefits that may be realized by the apparatus of the present application and with its many embodiments.

BRIEF DESCRIPTION OF THE SEVERAL VIEWS OF THE DRAWINGS

Other objectives of the disclosure will become apparent to those skilled in the art once the invention has been shown and described. The manner in which these objectives and other desirable characteristics can be obtained is explained in the following description and attached figures in which:

FIG. 9A is a left side view of the improved vibrato device/tremolo system.

FIG. 9B is a diagram of the movement of an adjustable pressure bar in the improved vibrato device/tremolo system.

FIG. 9C is an environmental view of the improved vibrato device/tremolo system.

Figure 1:
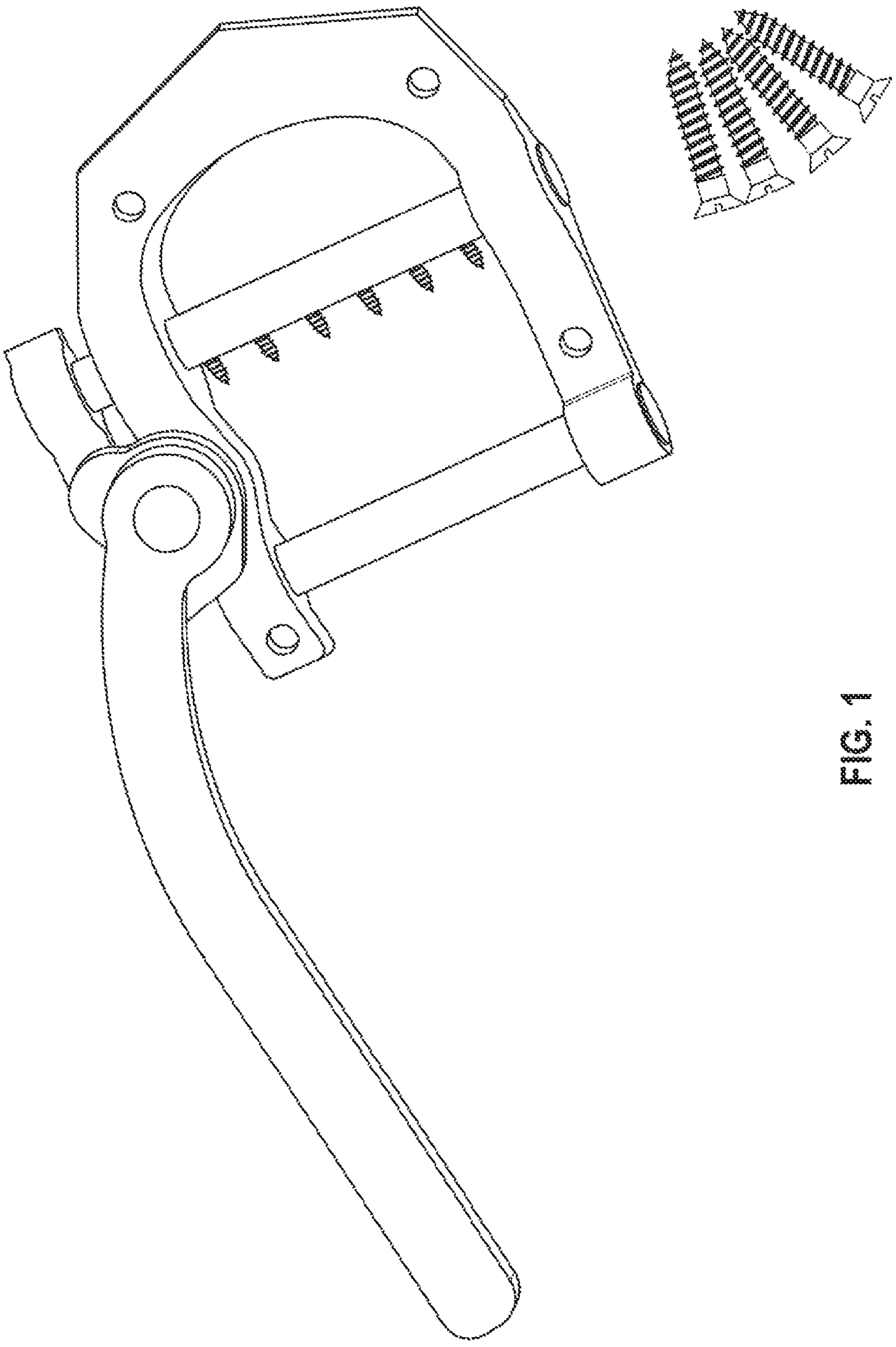
FIG. 1 is a top down view of a prior art Bigsby®-style vibrato device/tremolo system.

In the figures, the following reference numerals designate components.

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Other assembly methods may be practiced depending on the use of alternative embodiments described herein, and will be readily apparent to those skilled in the art.

FIG. 1 is a top down view of a prior art Bigsby®-style vibrato device/tremolo system. This prior art device was created to allow a string instrument user to manipulate vibrato by using a lever arm. This device typically put tuned strings out of tune when manipulation of the lever arm caused the tension in the string to change relative to the original tension setting.

Figure 2:
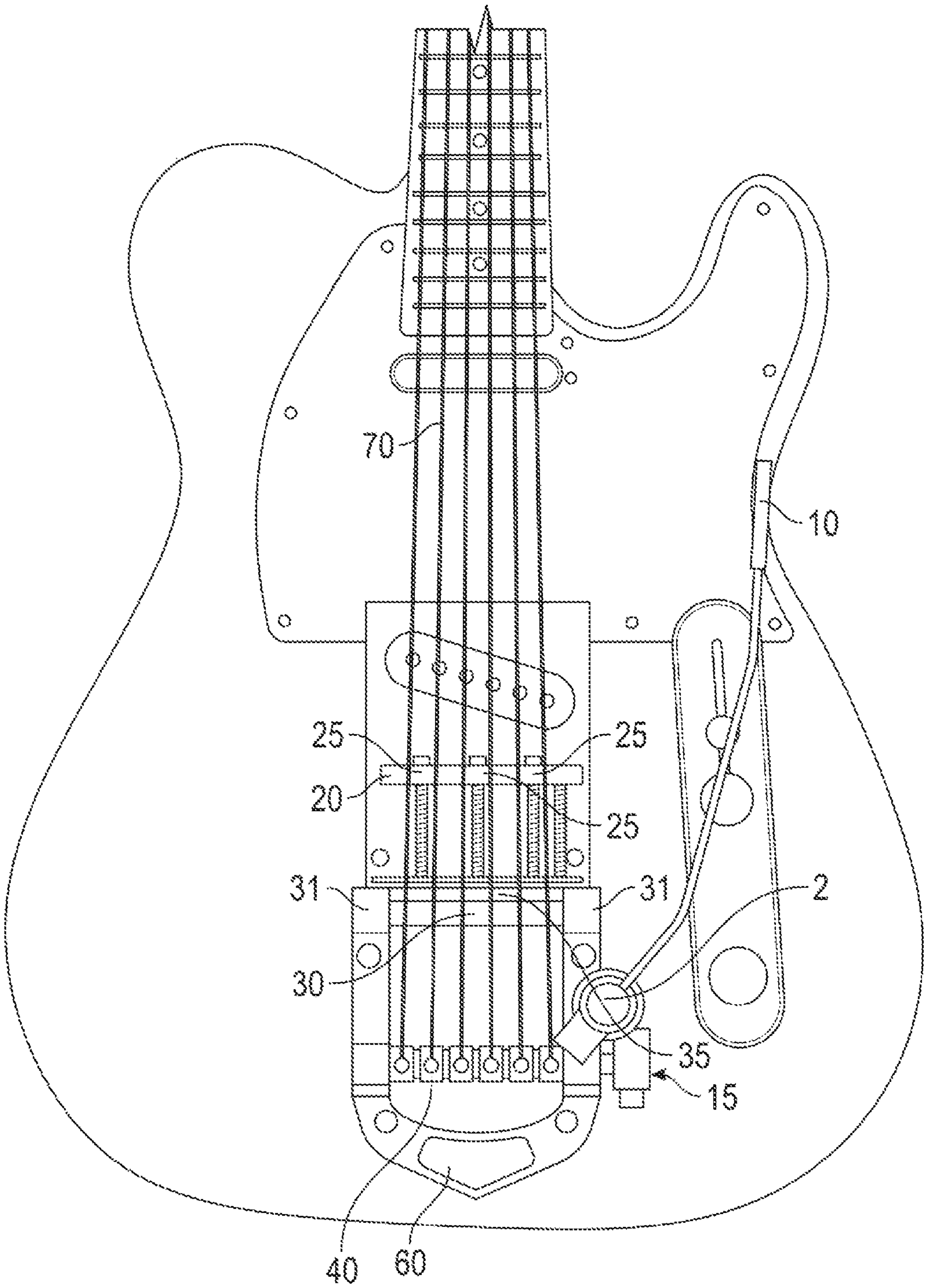
FIG. 2 is a top down view of a preferable embodiment of an improved vibrato device/tremolo system.

FIG. 2 is a top down view of an improved vibrato device, which may be made of various materials and chemical compositions such as, but not limited to, metal, plastic, wood, or some combination of materials, with the most common being steel. Steel has been found to have adequate strength to hold its shape while supporting the instrument's strings 70. The typical components of this preferable embodiment include, but are not limited to, a dual spring-loaded lever arm 10. The lever arm 10 is intended to sit separate and away from the instrument's strings 70 to allow for the user to manipulate the instrument's vibrato while playing by manually moving the lever arm 10 closer to or farther from the instrument. The lever arm 10 connects to the dual spring system 15; the dual spring system 15 houses the vibrato device's springs (see FIGS. 4A-8) that allow vibrato manipulation and sits attached to the tremolo system's tailpiece 60, which anchors the vibrato device to the instrument, and the pivoting metal bar 40. The pivoting metal bar 40 is the strings' 70 anchor-point at the base of the instrument, and the bar 40 pivots in response to the lever arm 10 being raised or lowered. When the bar 40 pivots, it either lessens the strings' 70 tension when the lever arm 10 is lowered or increases the strings' 70 tension when the lever arm 10 is raised.

Figure 3A:
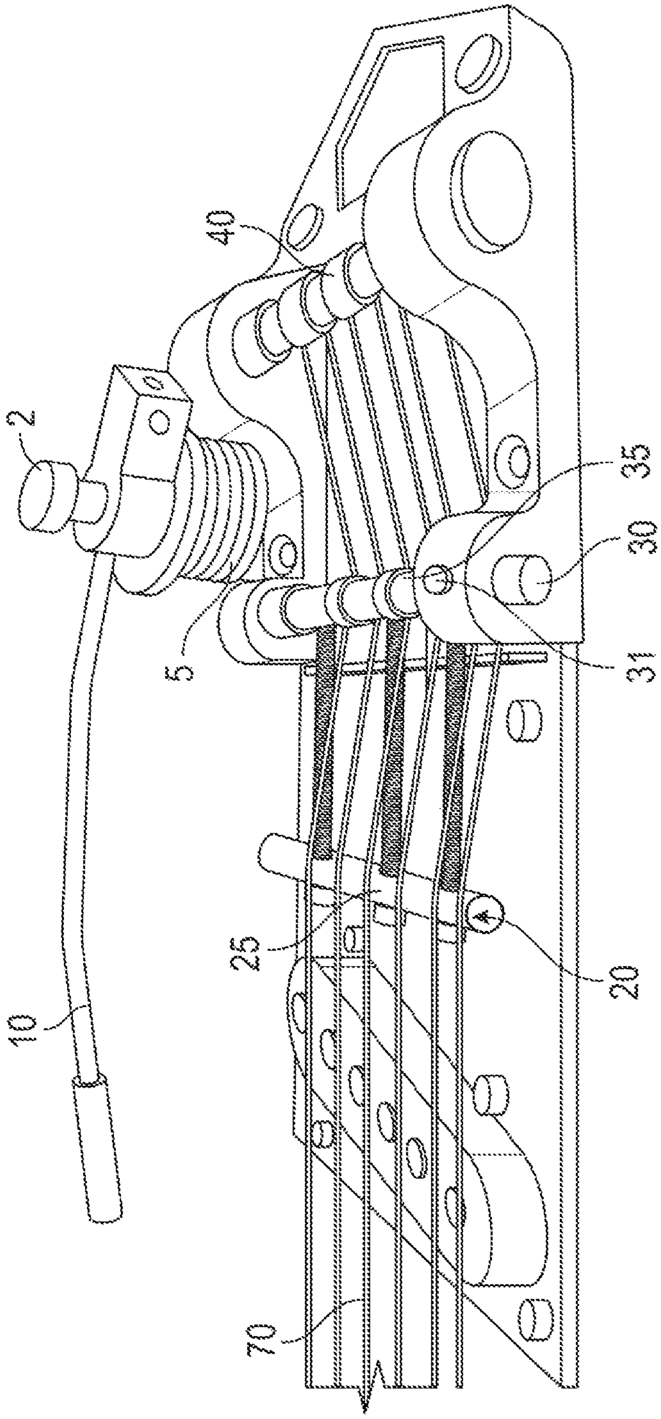
FIG. 3A is a left side view of the improved vibrato device/tremolo system with a dual spring-loaded lever arm in a neutral position.
Figure 3B:
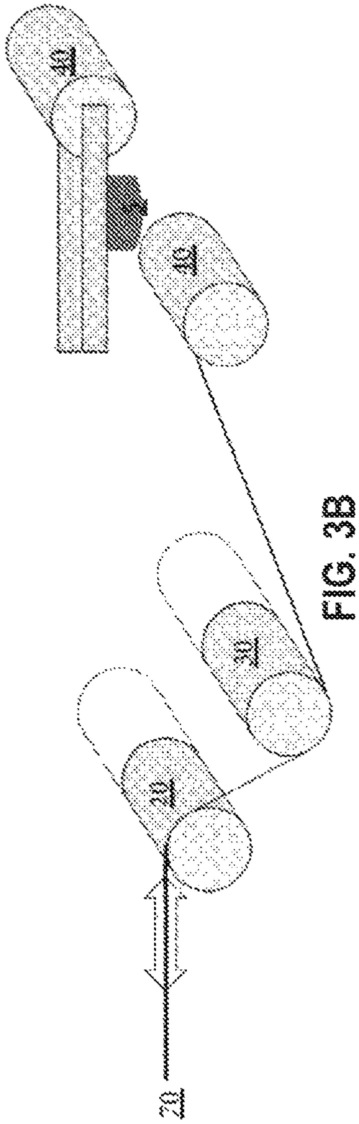
FIG. 3B is a diagram of the changes in the improved vibrato device/tremolo system with the dual spring-loaded lever arm in a neutral position.
Figure 4A:
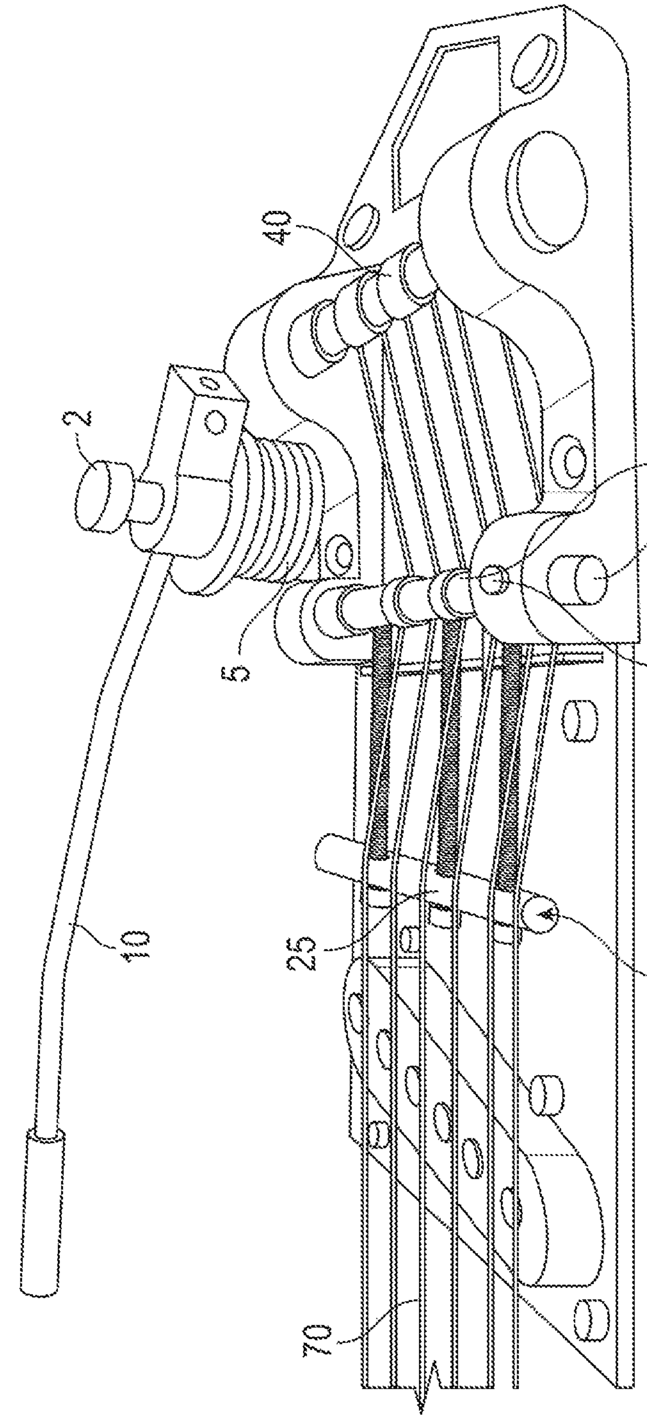
FIG. 4A is a left side view of the improved vibrato device/tremolo system with the dual spring-loaded lever arm in a raised position.
Figure 4B:
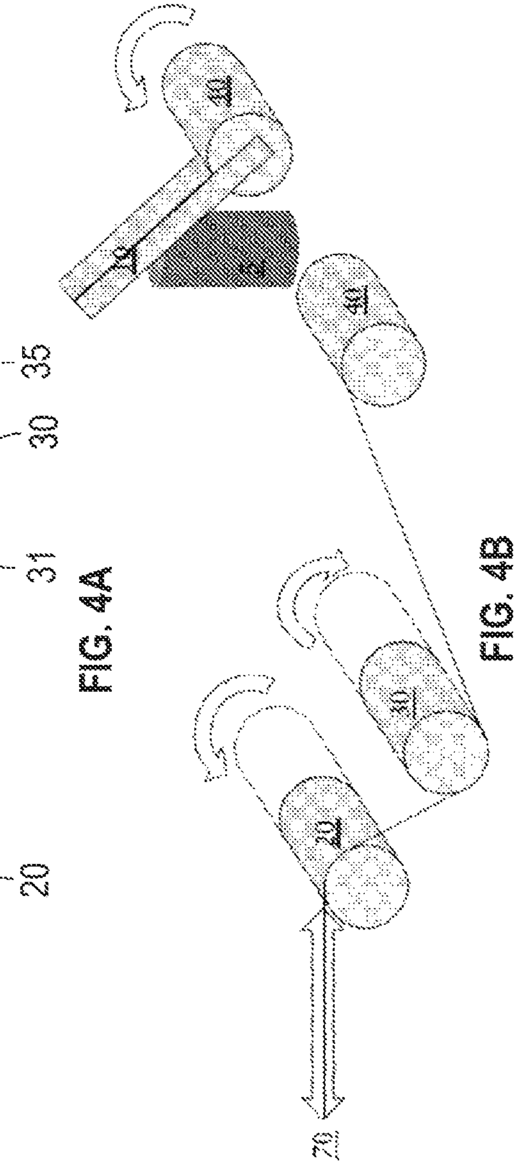
FIG. 4B is a diagram of the changes in the improved vibrato device/tremolo system with the dual spring-loaded lever arm in a raised position.
Figure 5:
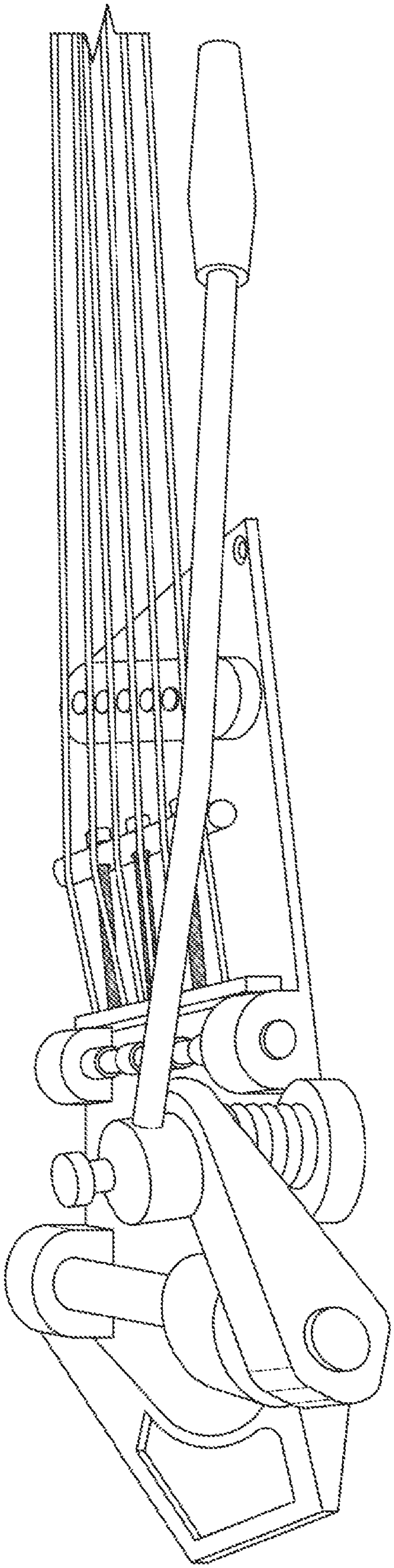
FIG. 5 is a right side view of the improved vibrato device/tremolo system.

Raising or lowering the lever bar 10 is illustrated in FIGS. 3A through 5. FIG. 3A is a left side view of the improved vibrato device with the dual spring-loaded lever arm 10 in a neutral position. FIG. 3B is a diagram of the tension in the improved vibrato device with the dual spring loaded lever arm 10 in a neutral position. FIG. 4A is a left side view of the improved vibrato device with the dual spring-loaded lever arm 10 in a raised position. FIG. 4B is a diagram of the changes in tension in the improved vibrato device with the dual spring-loaded lever arm 10 in a raised position. FIG. 5 is a right side view of the improved vibrato device.

As shown in FIGS. 3A-4B, As the strings 70 move opposite from the tailpiece 60, they run under the adjustable pressure bar 30; the pressure bar 30 maintains consistent pressure on the strings 70 so they remain under tension, even when the lever arm 10 is not raised. The user can adjust the bar's 30 pressure by tightening or loosening the adjustable pressure bar screws 31 to adjust the tension placed on the strings 70 by the bar 30. The bar 30 is composed of at least one roller 35 that allows tension to be optionally increased and decreased while reducing the wear on the strings 70. More specifically (shown in FIGS. 3B and 4B), the rollers move with the string as they are pulled back and forth by manipulation of the lever bar 10 and resulting pivoting of the bar 40. The rollers 35 increase the strings' 70 longevity and lower the likelihood of string damage over time. The rollers 70 also decrease the strain placed on the vibrato system while manipulating the lever arm 10 while playing, because the strings 70 move along the rollers 35 instead of simply rubbing against the pressure bar 30.

As the strings 70 continue to move opposite from the tailpiece 60 and adjustable pressure bar 30, they pass over the adjustable bridge 20. In some embodiments, the strings may each be adjusted independently via the adjustable bridge. The adjustable bridge 20 supports the strings 70 as tension is increased or decreased and adds improved stability when the strings 70 are strummed. The adjustable bridge 20 is composed of at least one saddle 25; the saddles 25 rock or roll when the string 70 moves in response to manipulation of the lever arm and resulting pivoting of the bar 40.

Figure 6A:
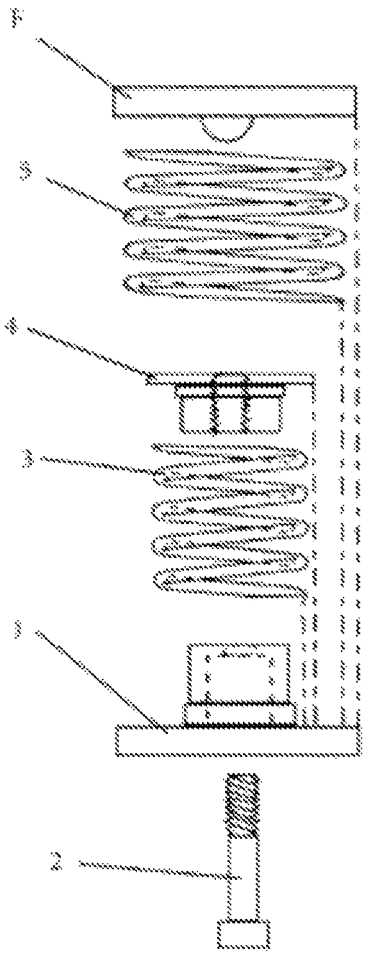
FIG. 6A is an exploded side view of a dual spring system of the improved vibrato device/tremolo system's dual spring-loaded lever arm.
Figure 6B:
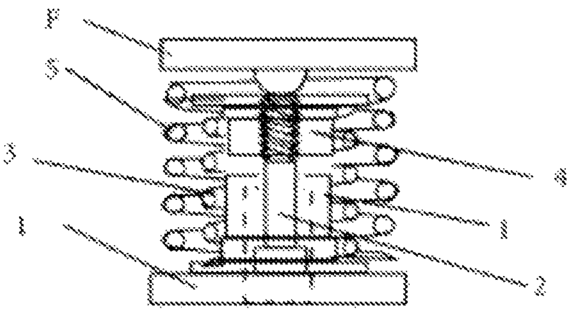
FIG. 6B is a cross-sectional side view of a down position of a dual spring system of the improved vibrato device/tremolo system's dual spring-loaded lever arm.
Figure 6C:
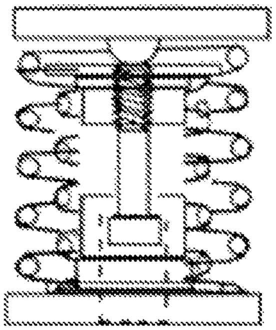
FIG. 6C is a cross-sectional side view of a stopped, rest, or neutral (open tuning) position of a dual spring system of the improved vibrato device/tremolo system's dual spring-loaded lever arm.
Figure 7:
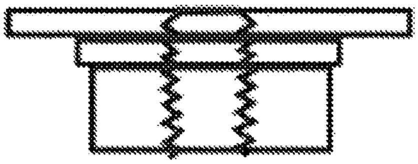
FIG. 7 is an enlarged cross-sectional the top plate.
Figure 8:
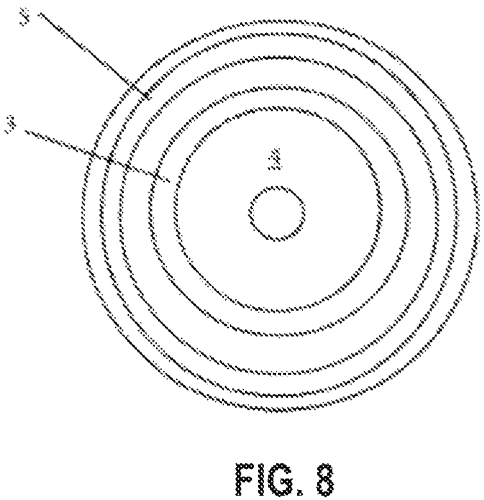
FIG. 8 is cross-sectional top down view of the dual spring system of the improved vibrato device/tremolo system's dual spring-loaded lever arm.

FIG. 6A-C is a cross-sectional view of the dual spring system 15 of the improved vibrato device's dual spring-loaded lever arm 10. FIG. 6A is an enlarged cross-sectional side view of the dual spring system 15 of the improved vibrato device's dual spring-loaded lever arm 10. FIG. 8 is cross-sectional top down view of the dual spring system 15 of the improved vibrato device's dual spring-loaded lever arm 10.

Figure 11A:
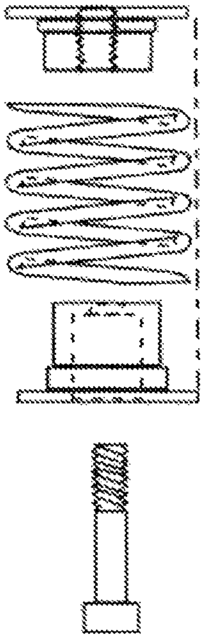
FIG. 11A is an exploded side view of an alternative embodiment of the spring system.
Figure 11B:
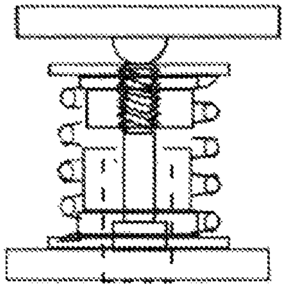
FIG. 11B is a cross-sectional side view of the alternative embodiment of the spring system in a down.

As shown in FIGS. 6A and 6B the inner spring (3) in the base (1) shows a cavity for the head of a screw (2) to move freely through the base 1 to attach to the top plate (4) and adjusting the screw (2) will increase the compression of the inner screw (3). When pressure is applied to the top plate (4), the top plate will further compress the spring because the bolt (2) will lower through the base (1) until the top plate (4) hits the base (1). When released the spring force of the inner spring (3) will return the top plate (4) upward until the screw (2) abuts again with the base (1). The outer spring (5) or dual stop spring will hold the base (1) in place when the inner spring (3) is slack. An alternative to the outer spring (5) could be an adhesive or screw for attaching the base (1) to the lower end of the inner spring (3). This alternative embodiment is shown in FIGS. 11A through 11C.

As shown in FIGS. 6A-8, the dual-spring system 15 may suitably be defined by a top plate 4 with a bore for receiving a lever bar spring 2, an inner spring 3 and outer spring 5 sandwiched between the top plate and a bottom or base plate 1 with a threaded receptacle for securing the screw (and accordingly the top plate) to the base plate 1. Suitably, the outer spring 5 resists and/or provides compression of the top plate 4 relative to the base plate 5. Suitably, the top plate 4 may be compressed under a force, e.g., the force of a downward movement of the lever arm 10 (not shown) but the top plate will return to its original position under the force of the outer spring when the compression force is removed from the top plate 4. Suitably, the inner spring resist expansion of the top plate 4 relative to the base plate 1. Suitably, the top plate 4 may be expanded by a force, e.g., the force of an upward movement of the lever arm 10 (not shown) but the top plate will return to its original position under the force of the inner spring when the expansion force is removed. In this arrangement, a lever arm 10 may be raised or lowered by a musician before the lever arm returns to its original position under the force of the spring. Suitably, the competing forces of the inner and outer spring reduce the chance of a string being pulled out of tune during manipulation of the lever arm. The two springs preferably hold the strings at open tuning whenever the handle is released by a user.

Figure 10A:
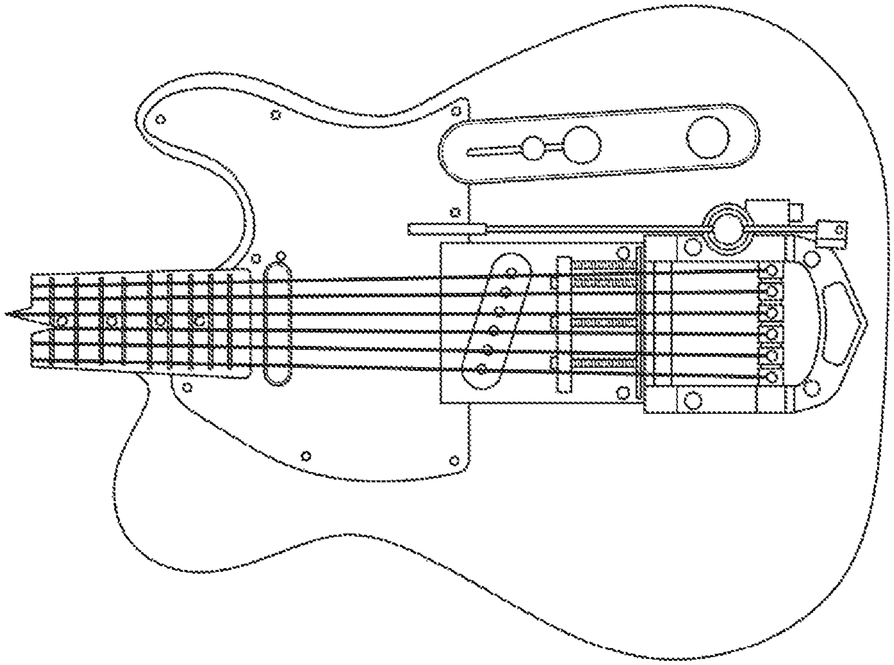
FIG. 10A is a top view of the device showing a handle in a down position for storage of the device.
Figure 10B:
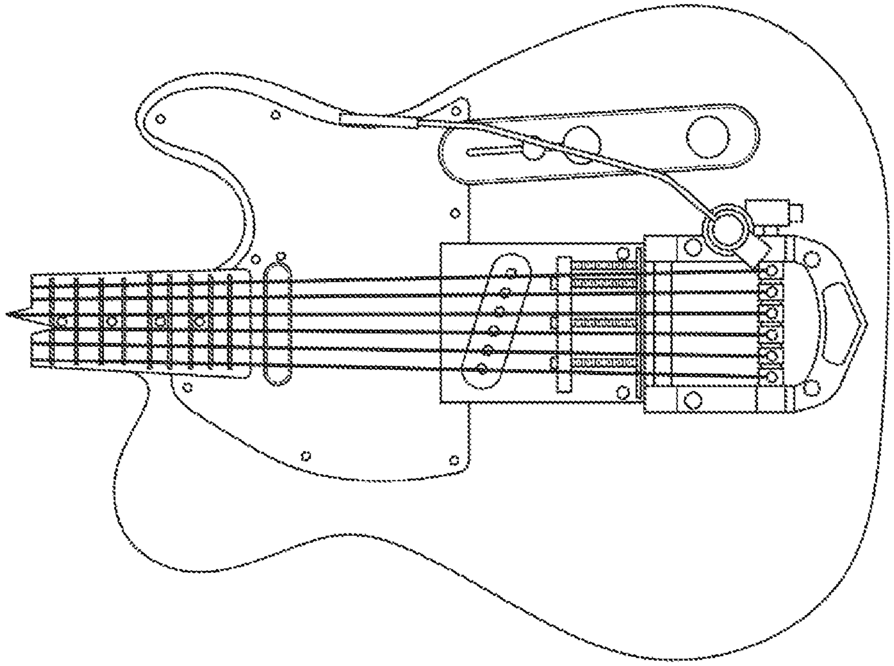
FIG. 10B is a top view of the device showing the handle in a ready position.

FIG. 9A is a left side view of another embodiment of the improved vibrato device. FIG. 9B is a diagram of the movement of an adjustable pressure bar 30 in the improved vibrato device. FIG. 9C is an environmental view of the improved vibrato device. As shown, the vibrato includes a shaft base (A), a shaft handle (B), a cavity block or sliding block (C), a knurl-lock screw (D), a lock-set screw (E), and a handle base (F). As discussed above, the purpose of the adjustable handle is to provide a shaft base (A) that can move freely around the handle base (F) while interfacing with the top plate (1) of the compression spring so that the vibrato can be held to a steady rest position via the inner and outer springs (3),(5). In one mode of operation, a musician may suitably adjust the shaft handle vertically and horizontally to customize the handle fit to the musician's instrument and playing-style or comfort. In one embodiment, the knurl lock screw (D) is provided for raising or lowering the shaft base (A) relative to the handle base (F) so the height of the handle can be customized to the user. In another embodiment, the handle may be slid forward or backward within the shaft base (A) so that the handle length relative to the strings is customized to the preferred location. In one mode of operation, the knurl screw (D) and set screw (E) may both be loosened sufficiently so that the handled can be lowered and positioned such that the instrument can be placed in a guitar case while the handle is a down position without loosening or tautening the strings of the guitar (see, e.g., FIGS. 10A-10B). FIGS. 9A-C also illustrate that the adjustable pressure bar 30 may be raised or lowered via turning the screw 31. This adjustable pressure allows a user to adjust the tension of the strings. It should be noted that the pressure bar can be adjusted in use to a locations sufficient to apply as little pressure as possible to the strings to eliminate "string buzz." On the other hand, some musicians prefer to increase or decrease the pressure on the strings to modify the string's sound.

Figure 11C:
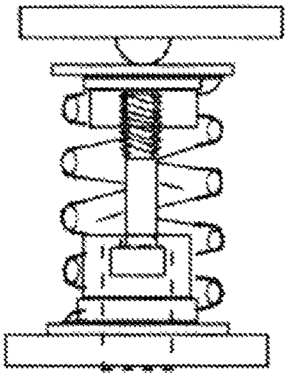
FIG. 11C is a cross-sectional side view of the alternative embodiment of the spring system in a stopped, rest, or neutral (open tuning) position.
Figure 11D:
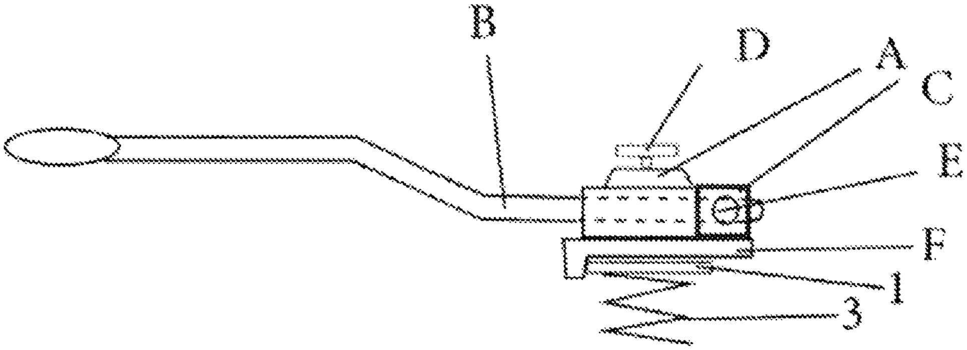
FIG. 11D is an environmental view of the alternative embodiment of the spring system.

FIGS. 11A-11D illustrate an alternate embodiment of the spring system. As shown in FIG. 11C, a compression spring (3) exerts an upward force on the top plate (4) relative to the base (1) until the shoulder of the screw (2) hits the extent of the screw receptacle in the base (1). This stopping point puts the strings in a neutral, rest or open tuning position. From the open tuning position the spring system may be compressed downward to a down position shown in FIG. 11B to lower the pitch of the strings or pulled upward past the rest position. In either situation the strings will return to the open tuning or rest position shown in FIG. 11C due to the stop depicted in that figure.

Figure 12A:
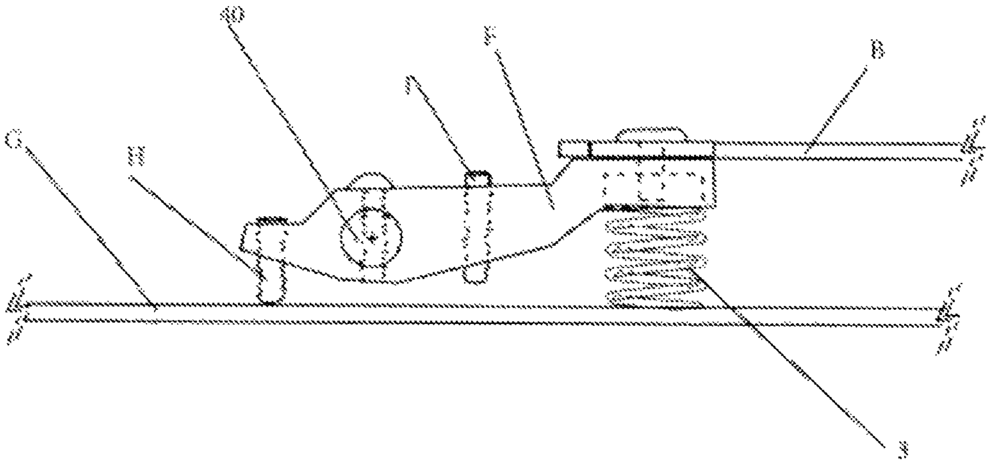
FIG. 12A is a side view of an alternate embodiment of the spring system.
Figure 12B:
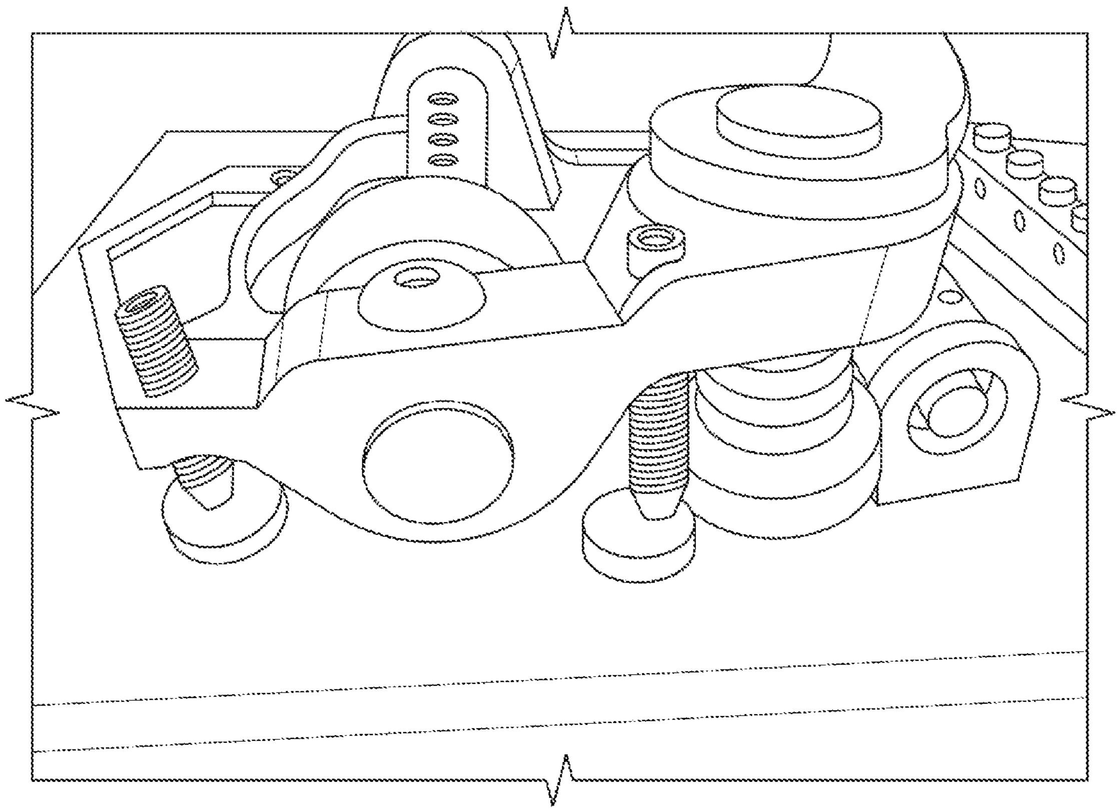
FIG. 12B is a side view of an alternate embodiment of the spring system.

FIGS. 12A and 12B show an alternate embodiment of a spring system. As shown, this embodiment may include a compression spring (3) and/or a dual spring (not shown) sandwiched between the handle base (F) and the vibrato base (G) wherein the spring (3) compresses during a down stroke of the handle (B) and handle base (F) around the pivoting metal bar or string shaft (40). Suitably, the handle base (F) includes a down-stroke stop (I) that prevents the handle base from rotating the pivoting metal bar 40 beyond a predetermined point. As shown, the down stroke stop (I) may be defined by a set screw provided between the spring (3) and the pivoting metal bar (40) wherein the height of the set screw may be adjusted so that the screw abuts the vibrato base (G) at a preferred stopping point. Suitably, the handle base (F) includes a neutral or open tuning stop or position that is defined by a set screw (H) that is located so that the pivoting metal bar (40) is situated between the spring (3) and the set screw (H). Suitably, the spring force of the spring (3) will return the system to a neutral or open tuning stopping point where the set screw (H) abuts against the vibrato base (G). In this embodiment, the height of the set screw (H) may be adjusted so that the screw (H) abuts the vibrato base (G) at a preferred open tuning point for the strings (not shown).

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. The principles of the disclosure may be applied to a Bigsby® Style Vibrato, Jazzmaster Vibrato, Thus, the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

I claim:

1. A spring system for tuning a string of a musical instrument, said spring system including an open tuning stop, said spring system comprising a compression spring (3) that is located between a top plate (4) and a base (1), where the top plate (4) is threaded to receive a screw (2) and where the spring (3) exerts an upward force on the top plate (4) relative to the base (1) until a shoulder of the screw (2) abuts the extent of a screw receptacle in the base (1), wherein said abutment puts a string of a musical instrument in an open tuning position.

2. The spring system of claim 1 comprising a compression spring (3) that is sandwiched between a lever arm (F) and a vibrato base (G), wherein compressing the spring (3) via a down stroke of the lever arm rotates a string bar (40) until a set screw (I) abuts the vibrato base (G), and wherein an up stroke of the lever arm rotates a string bar (4) until a second set screw (H) abuts the vibrato base.

3. An adjustable handle for a vibrato device of a musical instrument, said adjustable handle comprising:

a shaft base with a lever arm rotatably and slidably received therein the shaft base;

a set-screw provided in the shaft base for restricting the rotatability and slidability of the lever arm received therein the shaft base;

a handle base slidably connected to the lever arm via a knurl screw and mechanically connected to the shaft base via a receptacle;

whereby placing the shaft base in the receptacle and setting the set screw of the shaft base defines the length of the lever arm and the height of the lever arm relative to the musical instrument.

4. The adjustable handle of claim 3 wherein when the lever arm is actuated toward the musical instrument an inner spring of a dual-spring system provides resistance to the arm wherein the tension of the inner spring is increased or decreased through the tightening or loosening of a bolt.

5. The adjustable handle of claim 4 wherein when the lever arm is actuated away from the musical instrument an outer spring provides a force for sandwiching the inner spring between the top plate and a baseplate of the dual-spring system.

* * * * *